US012562952B2

(12) United States Patent
Li et al.

(10) Patent No.: US 12,562,952 B2
(45) Date of Patent: Feb. 24, 2026

(54) METHOD FOR ENABLING INTENT AND APPARATUS

(71) Applicant: HUAWEI TECHNOLOGIES CO., LTD., Guangdong (CN)

(72) Inventors: Yexing Li, Shanghai (CN); Xianming Li, Shanghai (CN); Yijun Yu, Dongguan (CN); Yaoguang Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/539,301

(22) Filed: Dec. 14, 2023

(65) Prior Publication Data

US 2024/0113931 A1 Apr. 4, 2024

Related U.S. Application Data

(63) Continuation of application No. PCT/CN2022/101238, filed on Jun. 24, 2022.

(30) Foreign Application Priority Data

Jul. 12, 2021 (CN) .......................... 202110783286.5

(51) Int. Cl.
*H04L 41/06* (2022.01)
(52) U.S. Cl.
CPC .................................... *H04L 41/06* (2013.01)
(58) Field of Classification Search
CPC ....................................................... H04L 41/06
See application file for complete search history.

(56) References Cited

U.S. PATENT DOCUMENTS

| | | | | |
|---|---|---|---|---|
| 10,411,951 | B2 * | 9/2019 | Clark | .................. H04L 41/0866 |
| 11,283,691 | B1 * | 3/2022 | A | ............................. H04L 63/02 |
| 2020/0178093 | A1 * | 6/2020 | Peng | ............... H04W 36/00838 |

FOREIGN PATENT DOCUMENTS

| | | | |
|---|---|---|---|
| CN | 111277442 | * | 1/2020 |
| CN | 111277442 | A | 6/2020 |
| CN | 112365888 | A | 2/2021 |

OTHER PUBLICATIONS

ETSI GR ENI 008 v2.1.1 "Experential Networked Intelligence (ENI); Intent Aware Network Autonomicity (ITANA)" hereinafter ETSI, https://www.etsi.org/deliver/etsi_gr/ENI/001_099/008/02.01.01_60/gr_ENI008v020101p.pdf (Year: 2021).*

(Continued)

*Primary Examiner* — Glenton B Burgess
*Assistant Examiner* — Patrick F Ngankam

(57) ABSTRACT

This application provides a method for enabling an intent and an apparatus. The method includes: A first network element obtains first information, where the first information indicates at least one intent, and the at least one intent is all intents that conflict with a first intent. When the first network element determines that a status of the at least one intent changes, the first network element initiates a procedure of enabling the first intent. According to the solution of this application, when the first intent is in a conflict state, the first network element may initiate the procedure of enabling the first intent after determining that statuses of all the intents that conflict with the first intent change. The solution in this application can be used to re-initiate, in a timely, accurate, and efficient manner, the procedure of enabling the first intent.

18 Claims, 6 Drawing Sheets

(56) References Cited

OTHER PUBLICATIONS

Nagendra et al. "An Intent-Based Automation Framework for Securing Dynamic Consumer IoT Infrastructures", https://www.csl.sri.com/~vinod/papers/viscr.pdf (Year: 2020).*

ETSI GR ENI 008 v2.1.1 "Experiential Networked Intelligence (ENI); InTent Aware Network Autonomicity (ITANA)", https://www.etsi.org/deliver/etsi_gr/ENI/001_099/008/02.01.01_60/gr_ENI008v020101p.pdf (Year: 2021).*

"Experiential Networked Intelligence (ENI); InTent Aware Network Autonomicity (ITANA)", ETSI GR ENI 008 V2.1.1 (Mar. 2021), pp. 1-26, P014396015.

* cited by examiner

METHOD FOR ENABLING INTENT AND APPARATUS

CROSS-REFERENCE TO RELATED APPLICATIONS

This application is a continuation of International Patent Application No. PCT/CN2022/101238, filed on Jun. 24, 2022 which claims priority to Chinese Patent Application No. 202110783286.5, filed on Jul. 12, 2021. The disclosures of the aforementioned applications are hereby incorporated by reference in their entireties.

TECHNICAL FIELD

This application relates to the field of wireless communication, and more specifically, to a method for enabling an intent and an apparatus.

BACKGROUND

After an intent is set to a conflict state, to enable the intent again, an intent management network element may periodically initiate a procedure of enabling the intent. However, duration of the period is difficult to determine. Specifically, if the period is set to be long, the intent may not be woken up in time. If the period is set to be short, the procedure of enabling the intent needs to be frequently initiated, consuming a large quantity of system resources. Therefore, how to initiate, in a timely, accurate, and efficient manner, the procedure of enabling the intent is an urgent problem to be resolved.

SUMMARY

This application provides a method for enabling an intent and an apparatus.

According to a first aspect, a method for enabling an intent is provided, including:

A first network element obtains first information, where the first information indicates at least one intent, and the at least one intent is all intents that conflict with a first intent. When the first network element determines that a status of the at least one intent changes, the first network element initiates a procedure of enabling the first intent.

According to the solution of this application, when the first intent is in a conflict state, the first network element may initiate the procedure of enabling the first intent after determining that statuses of all intents that conflict with the first intent change. Compared with that an intent management network element periodically initiates the procedure of enabling the first intent, the solution in this application can be used to re-initiate, in a timely, accurate, and efficient manner, the procedure of enabling the first intent.

With reference to the first aspect, in some implementations of the first aspect, the method further includes:

The first network element obtains at least one piece of second information, where the second information indicates that statuses of one or more intents in the at least one intent change. That the first network element determines that a status of the at least one intent changes includes: The first network element determines, based on the at least one piece of second information, that the status of the at least one intent changes.

With reference to the first aspect, in some implementations of the first aspect, that the first network element determines, based on the at least one piece of second information, that the status of the at least one intent changes includes:

The first network element marks the one or more intents in the first information based on the second information. When the at least one intent is marked in the first information, the first network element determines that the status of the at least one intent changes.

Alternatively, the first network element deletes identifiers of the one or more intents from the first information based on the second information. When an identifier of the at least one intent is deleted from the first information, the first network element determines that the at least one intent changes.

According to the solution of this application, the first network element may determine, in a manner of updating the first information for one or more times, that the status of the at least one intent that conflicts with the first intent changes.

With reference to the first aspect, in some implementations of the first aspect, when the first network element is an intent translation network element or an intent execution network element, the second information includes identification information of the first information.

According to the solution of this application, when the first network element is the intent translation network element or the intent execution network element, the second information obtained by the first network element may include the identification information of the first information, so that the first network element learns that the first information needs to be updated, instead of updating other information, thereby improving efficiency of updating the first information by the first network element based on the second information.

With reference to the first aspect, in some implementations of the first aspect, when the first network element is an intent management network element, the second information indicates any one of the following:

deleting the one or more intents in the at least one intent, setting the one or more intents in the at least one intent to a conflict state, modifying the one or more intents in the at least one intent, changing executable commands of the one or more intents in the at least one intent, ending execution of the one or more intents in the at least one intent, or suspending execution of the one or more intents in the at least one intent.

According to the solution of this application, when the first network element is the intent management network element, the first network element may obtain the second information from the intent translation network element, the intent execution network element, and an intent consumption network element. When the first network element determines that any one of the foregoing cases occurs in an intent, the first network element determines that a status of the intent changes. It should be understood that a change of the intent status in this application is not limited to the foregoing enumerated cases.

With reference to the first aspect, in some implementations of the first aspect, that a first network element obtains first information includes:

When the first network element is an intent translation network element, the first network element obtains the first information locally based on a result of performing syntax conflict detection on the first intent. When the first network element is an intent execution network element, the first network element obtains the first information locally based on a result of performing operation conflict detection on the first intent. When the first network element is an intent management network element, the first network element obtains the first information from an intent translation network element or an intent execution network element.

With reference to the first aspect, in some implementations of the first aspect, that the first network element initiates a procedure of enabling the first intent includes:

When the first network element is an intent management network element or an intent execution network element, the first network element sends third information to an intent translation network element. The third information indicates to perform syntax conflict detection on the first intent. When the first network element is an intent translation network element, the first network element performs syntax conflict detection on the first intent.

With reference to the first aspect, in some implementations of the first aspect, the method further includes: The first network element obtains fourth information, where the fourth information indicates that the first information corresponds to the first intent.

According to the solution of this application, the first network element determines, by obtaining the fourth information, that the first information is associated with the first intent. Therefore, after determining that the status of the at least one intent changes, the first network element needs to initiate the procedure of enabling the first intent instead of initiating a procedure of enabling another intent.

According to a second aspect, a method for enabling an intent is provided, including: An intent management network element obtains first information. The first information indicates at least one intent, and the at least one intent is all intents that conflict with a first intent. When the intent management network element determines that statuses of one or more intents in the at least one intent change, the intent management network element sends second information. The second information indicates that the statuses of the one or more intents in the at least one intent change.

According to the solution of this application, when the first intent is in a conflict state, the intent management network element may obtain identifiers of all intents that conflict with the first intent. After determining that the statuses of one or more of the intents change, the intent management network element immediately sends the second information, so that an intent translation network element or an intent execution network element may update the first information in time based on the second information.

With reference to the second aspect, in some implementations of the second aspect, that statuses of one or more intents in the at least one intent change includes any one of the following:

The one or more intents in the at least one intent are deleted, the one or more intents in the at least one intent are set to a conflict state, the one or more intents in the at least one intent are modified, executable commands of the one or more intents in the at least one intent change, execution of the one or more intents in the at least one intent ends, or execution of the one or more intents in the at least one intent is suspended.

With reference to the second aspect, in some implementations of the second aspect, the method further includes:

The intent management network element determines a conflict type, where the conflict type indicates that a syntax conflict or an operation conflict exists between the first intent and the at least one intent.

According to the solution of this application, when the intent management network element obtains the first information from the intent translation network element, the intent management network element determines that the conflict type is a syntax conflict. When the intent management network element obtains the first information from the intent execution network element, the intent management network element determines that the conflict type is an operation conflict. That is, the intent management network element may determine the conflict type based on a source of the first information.

With reference to the second aspect, in some implementations of the second aspect, that the intent management network element sends second information includes:

When the conflict type indicates that the syntax conflict exists between the first intent and the at least one intent, the intent management network element sends the second information to the intent translation network element. When the conflict type indicates that the operation conflict exists between the first intent and the at least one intent, the intent management network element sends the second information to the intent execution network element.

According to the solution of this application, the intent management network element may determine, based on conflict type information, to send the second information to the intent translation network element or the intent execution network element.

It should be understood that the conflict type information implicitly indicates that the intent management network element needs to send the second information to the intent translation network element or the intent execution network element.

In a possible implementation, the intent management network element may further determine, based on explicit information, to send the second information to the intent translation network element or the intent execution network element. This is not limited in this application.

With reference to the second aspect, in some implementations of the second aspect, the second information includes identification information of the first information. The identification information of the first information is obtained by the intent management network element from the intent translation network element or the intent execution network element.

According to the solution of this application, the second information sent by the intent management network element may include the identification information of the first information, so that the intent translation network element or the intent execution network element learns that the first information needs to be updated instead of updating other information, thereby improving efficiency of updating the first information by the intent translation network element or the intent execution network element based on the second information.

According to a third aspect, a method for enabling an intent is provided, including: A second network element obtains first information. The first information indicates at least one intent, and the at least one intent is all intents that conflict with a first intent. The second network element sends the first information to an intent management network element, so that the intent management network element initiates, after determining that a status of the at least one intent changes, a procedure of enabling the first intent.

According to the solution of this application, the second network element may be an intent translation network element or an intent execution network element. When the second network element is the intent translation network element, the second network element obtains the first information locally based on a result of syntax detection, and sends the first information to the intent management network element. When the second network element is the intent execution network element, the second network element obtains the first information locally based on a result of operation detection, and sends the first information to the intent management network element. The intent management network element may initiate, based on the first information after determining that the status of the at least one intent that conflicts with the first intent changes, the procedure of enabling the first intent.

With reference to the third aspect, in some implementations of the third aspect, the method further includes:

The second network element sends fourth information to the intent management network element. The fourth information indicates that the first information corresponds to the first intent.

According to the solution of this application, the second network element may send the fourth information to the intent management network element, so that the intent management network element determines that the first information is associated with the first intent. Therefore, after determining that the status of the at least one intent changes, the intent management network element needs to initiate the procedure of enabling the first intent instead of initiating a procedure of enabling another intent.

According to a fourth aspect, a communication device is provided. The communication device includes units configured to perform the method according to the first aspect or the implementations of the first aspect.

According to a fifth aspect, a communication device is provided. The communication device includes units configured to perform the method according to the second aspect or the implementations of the second aspect.

According to a sixth aspect, a communication device is provided. The communication device includes units configured to perform the method according to the third aspect or the implementations of the third aspect.

According to a seventh aspect, a communication device is provided, including at least one processor. A memory is configured to store a computer program. When the communication apparatus runs, the processor executes the computer program or instructions stored in the memory, so that the communication apparatus performs the method according to any one of the possible implementations of the first aspect to the third aspect. The memory may be located in the processor, or may be implemented by using a chip independent of the processor. This is not specifically limited in this application.

According to an eighth aspect, a computer-readable storage medium is provided, which includes a computer program. When the computer program is run on a computer, the computer is enabled to perform the method according to any one of the possible implementations of the first aspect to the third aspect.

According to a ninth aspect, a chip is provided. A processing circuit is disposed on the chip, and the processing circuit is configured to perform the method according to any one of the possible implementations of the first aspect to the third aspect.

According to a tenth aspect, a computer program product is provided. The computer program product includes: a computer program (or may be referred to as code or instructions). When the computer program is run, the computer is enabled to perform the method according to any one of the possible implementations of the first aspect to the third aspect.

According to an eleventh aspect, a communication system is provided. The communication system includes an intent management network element, an intent translation network element, and an intent execution network element.

The intent translation network element is configured to perform the method according to any one of the possible implementations of the first aspect, and the intent management network element is configured to perform the method according to any one of the possible implementations of the second aspect.

Alternatively, the intent execution network element is configured to perform the method according to any one of the possible implementations of the first aspect, and the intent management network element is configured to perform the method according to any one of the possible implementations of the second aspect.

Alternatively, the intent management network element is configured to perform the method according to any one of the possible implementations of the first aspect, and the intent translation network element is configured to perform the method according to any one of the possible implementations of the third aspect.

Alternatively, the intent management network element is configured to perform the method according to any one of the possible implementations of the first aspect, and the intent execution network element is configured to perform the method according to any one of the possible implementations of the third aspect.

DESCRIPTION OF EMBODIMENTS

Figure 1:
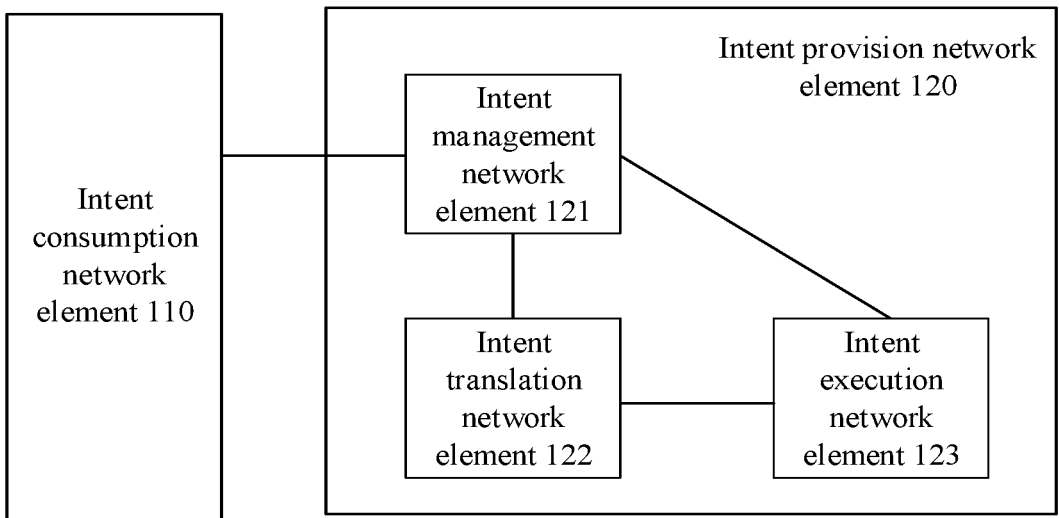
FIG. 1 shows an architecture of a system to which an embodiment of this application is applicable.

The following describes technical solutions of this application with reference to accompanying drawings.

The technical solutions of this application may be applied to various network function virtualization (network function virtualization, NFV) systems. In the system, a current service technical solution, a network construction solution, and a network operation and maintenance method of an operator may be described as a mode and a policy by using a standard formal language, and the technical solution and the construction solution are implemented based on the mode and the policy. For example, the technical solutions in this application may be applied to one or more of the following systems: a wireless intent-driven network (wireless intent-driven network, WIDN) system, an experiential network intelligence (experiential networked intelligence, ENI) system, an intent-driven management service (intent-driven management service, IDMS) system, an open network automation platform (open network automation platform, ONAP) system, or the like.

For clarity, the following explains some terms in embodiments of this application.

Intent: an expectation of an action system. The intent may include one or more of the following: a requirement, an intent target, and a constraint.

Intent instance: an object obtained after an intent is instantiated. For example, in this application, an intent may be replaced with an intent instance.

Intent expression: an expression used to carry an intent. The expression includes one or more of the following items: an intent action name, an intent action attribute, an intent object name, and an intent object attribute. The intent expression has specific syntax and semantics.

Intent target: indicates the target value that needs to be achieved by an intent.

Intent translation: a procedure of converting an intent into an intent executable command, a rule, or a sub-intent.

Intent execution: delivers an intent executable command, a sub-intent, and a rule, and adjusts the intent executable command, the sub-intent, and the rule based on a network environment and an intent fulfillment situation.

Intent executable command: a series of instructions formed by an intent by using operations such as a translation decision.

Intent pattern: specifies syntax and semantics of an intent expression. The intent pattern may include one or more of the following: a field, a value range of the field, a type of the field, and a hierarchical relationship between fields. For example, a field may be used to describe a type, name, or consumer of an intent pattern.

An intent in an activated state indicates that the intent is being executed. An intent in a conflict state indicates that the intent conflicts with the intent in the system. An intent in a deactivated state indicates that the intent is not executed. An intent in a sleep state indicates that the intent is temporarily stopped because the intent target is not achieved for a long time.

Intent context: data generated during intent instance running.

Intent creation: an intent in an intent system is created and a corresponding intent context is created.

Intent knowledge: Intent knowledge is parameters related to intent patterns stored in an intent knowledge base. For example, the foregoing related parameters may include one or more of the following: an executable operation corresponding to the intent, an intent entity identifier, or an intent entity type.

Intent operation: an executable operation corresponding to the intent target.

Intent conflict: When two intents cannot be achieved at the same time due to an intent expression, execution operation, or semantic exclusion, the two intents conflict. Optionally, an intent conflict may be a conflict between an intent that needs to be created and an intent that is in an activated state in the system.

For ease of understanding embodiments of this application, a system applicable to embodiments of this application is first described in detail with reference to FIG. 1. As shown in FIG. 1, the system includes an intent consumption network element 110 and an intent provision network element 120. The intent provision network element may include an intent management network element 121, an intent translation network element 122, and an intent execution network element 123.

The intent consumption network element 110 may also be referred to as an intent consumer, and is an intent consumption subject. For example, the intent consumption network element 110 may be an operations support system (operations support systems, OSS), a business support system (business support systems, BSS), an application (application, APP), or other user equipment. For the IDMS system, the intent consumption network element 110 may be a service consumer or a management service (management service, MnS) network element, for example, a network management system (network management system, NMS). The intent consumption network element 110 may communicate with the intent provision network element 120. For example, the intent consumption network element 110 may send a request for creating an intent or implementing an intent to the intent provision network element 120.

The intent management network element 121 may be configured to manage an intent pattern, and may receive request information from the intent consumption network element 110, and process the request information. The intent management network element 121 may include an intent pattern library, and the intent pattern library is used to store an intent pattern. The intent management network element 121 may further include an intent instance library. The intent management network element 121 may obtain, by using the intent instance library, status information of an intent pattern, an intent target, and an operation corresponding to the intent.

The intent translation network element 122 may receive translation request information from the intent management network element 121, to implement a translation function of the intent. The intent translation network element 122 may further obtain the intent pattern from the intent management network element 121, and perform syntax and semantic check on information provided by the intent consumption network element 110.

The intent execution network element 123 may receive commands from the intent management network element 122 and the intent translation network element 121, and implement an operation related to the intent.

It should be noted that systems with different processing intents may further include another network element having a corresponding function.

For example, for the WIDN system, the system may further include an intent knowledge management network element and an intent knowledge base. The intent management network element is configured to manage intent knowledge, and the intent knowledge base is configured to store intent knowledge. The intent management network element may further include an intent pattern library and an intent instance library. The intent pattern library is used to store an intent pattern, and the intent instance library is used to store an intent.

For the ENI system, the ENI system may further include one or more of the following: an input function network element, an output function network element, an analysis function network element, and a decision function network element. The input function network element may include a data collection network element and a normalized network element, and is configured to receive data from an external system and perform an operation such as normalization on the data. The output function network element may include an output network element and a de-normalized network element, and is configured to convert an internal command of a system into a format that can be processed by an external system and send the format to the external system. The analysis function network element may be configured to perform perception analysis on an existing network status and predict a future network status. For example, the analysis function network element may include a knowledge management network element, a context awareness network element, and a cognitive management network element. The knowledge management network element may manage the intent knowledge, the context awareness network element may perform perception analysis on an existing network status, and the cognitive management network element may perform management analysis. The intent management network element and the intent translation network element may be sub-network elements in the analysis function network element. The decision function network element is configured to generate a new operation command based on a policy target and based on network status awareness, orchestrate the operation command, and send the operation command to the output network element. The decision function network element may include a policy management network element, a situation awareness network element, and a driver management network element. The policy management network element is configured to manage an intent policy, the situation awareness network element is configured to perform perception analysis on a network status, and the driver management network element is configured to perform driver management of an intent.

For the IDMS system, the intent consumption network element may be a network management system (network management system, NMS), the intent provision network element may be an element management system (element management system, EMS), and the intent management network element, the intent translation network element, and the intent execution network element may be submodules of the intent provision network element.

It should be noted that the solutions in this application may be applied to another system including a corresponding network element. This is not limited in this application.

Figure 2:
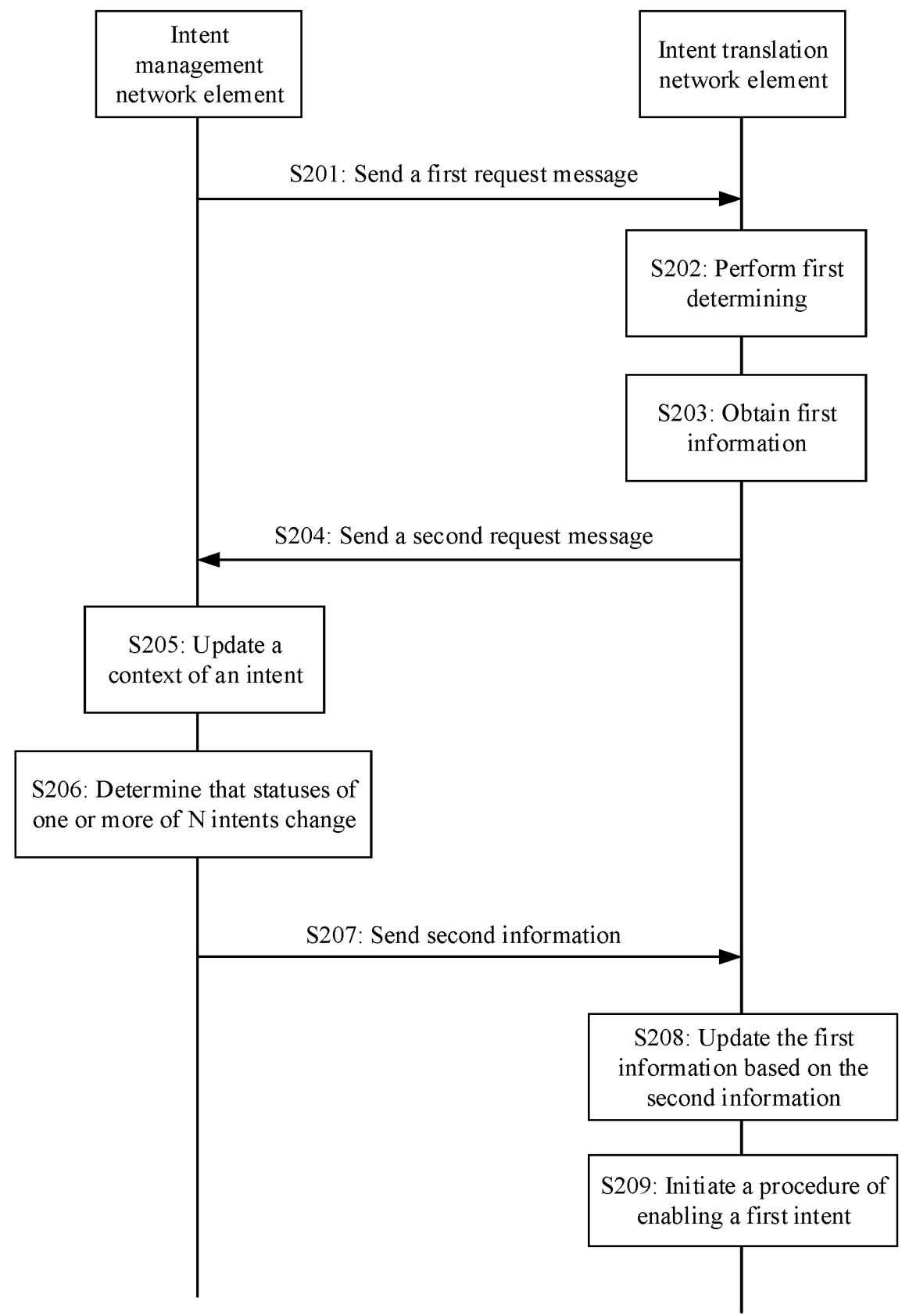
FIG. 2 is a schematic interaction diagram of an example of a method according to this application.

The following describes in detail the solutions provided in this application with reference to FIG. 2. It should be understood that the solution shown in FIG. 2 may be applicable to the system shown in FIG. 1. In this case, a first network element is an intent translation network element.

S201: An intent management network element sends a first request message to an intent translation network element, where the first request message is used to request to implement a first intent. Correspondingly, the intent translation network element receives the first request message.

S202: The intent translation network element performs first determining, where the first determining determines whether a syntax conflict exists between the first intent and an intent that is running in a system.

When a result of the first determining is yes, and the first intent is not implemented, the method further includes the following step:

S203: The intent translation network element locally obtains first information based on the result of the first determining, where the first information indicates N intents, the first information includes identification information of the N intents, the N intents are all intents that conflict with the first intent, and N is a positive integer. In addition, the intent translation network element generates and stores fourth information. The fourth information indicates that the first information corresponds to the first intent. The fourth information includes identification information of the first information and identification information of the first intent.

In a possible implementation, the intent translation network element may further generate the identification information of the first information.

In a possible implementation, the intent translation network element may further locally obtain fifth information based on the result of the first determining. The fifth information includes a field in which each of the N intents conflicts with the first intent.

For example, intents that are running in the system are an intent #1, an intent #2, an intent #3, and an intent #4, and the first intent is an intent #5. After the first determining is performed, the intent translation network element determines that the intent #1, the intent #2, and the intent #3 conflict with the intent #5. In this case, the first information and the fifth information may be shown in Table 1. A field #i is a field in which an intent #i conflicts with the intent #5, and i is traversed from 1 to 3.

TABLE 1

| First information | Fifth information |
| --- | --- |
| Intent #1 | Field #1 |
| Intent #2 | Field #2 |
| Intent #3 | Field #3 |

S204: The intent translation network element sends a second request message to the intent management network element, where the second request message is used to request to update a context of the intent. Correspondingly, the intent management network element receives the second request message.

The second request message is used to indicate to set the first intent to a conflict state.

In addition, the second request message may further include other information, which is described below in different cases.

Case 1:

The second request message further includes the first information.

Case 2:

The second request message further includes the first information and the identification information of the first information.

S205: The intent management network element updates the context of the intent based on the second request message.

Specifically, the intent management network element sets the first intent to the conflict state based on the second request message.

In addition, the intent management network element may further perform other operations based on the second request message, which is described below in different cases.

Case 1:

Corresponding to Case 1 in S204, the intent management network element stores the first information.

In a possible implementation, the intent management network element may further store conflict type information. For example, the conflict type information is added to the first information, and is stored.

Case 2:

Corresponding to Case 2 in S204, the intent management network element adds the identification information and conflict type information of the first information to contexts of the N intents based on the first information.

For example, identifiers of the N intents are the intent #1, the intent #2, and the intent #3. The intent management network element may add the identification information and the conflict type information of the first information to a context of the intent #1, as shown in Table 2. Similarly, the intent management network element may update a context of the intent #2 and a context of the intent #3.

TABLE 2

| Context of the intent #1 |
| --- |
| . . . |
| Identification information of the first information |
| Conflict type information |

It should be understood that the intent management network element may determine the conflict type information based on a sender of the second request message. For example, when the intent management network element receives the second request message from the intent translation network element, the intent management network element determines that the conflict type information indicates a syntax conflict.

S206: The intent management network element determines that statuses of one or more of the N intents change.

The following uses an example in which the first intent is the intent #5, the N intents include the intent #1, the intent #2, and the intent #3, and the intent management network element determines that a status of the intent #1 changes for description. That is, the N intents are all intents that conflict with the intent #5.

The following describes a manner in which the intent management network element determines that the status of the intent #1 changes.

Manner 1:

The intent consumption network element indicates the intent management network element to delete the intent #1, or set the intent #1 to a conflict state, or modify the intent #1.

The intent management network element determines, based on the indication of the intent consumption network element, that the status of the intent #1 changes.

Manner 2:

The intent management network element sends a third request message, where the third request message requests to implement an intent #6.

The intent translation network element performs syntax conflict detection and determines that a syntax conflict exists between the intent #1 and the intent #6. Alternatively, the intent execution network element performs operation conflict detection, and determines that an operation conflict exists between the intent #1 and the intent #6.

The intent translation network element or the intent execution network element indicates to set the intent #1 to a conflict state.

It should be understood that when the intent #1 conflicts with the intent #6, the intent translation network element or the intent execution network element chooses to implement the intent #6. In a possible implementation, the intent translation network element or the intent execution network element may be selected based on a priority of the intent. For example, the priority of the intent #6 is higher than that of the intent #1.

The intent management network element determines, based on the indication of the intent translation network element or the intent execution network element, that the status of the intent #1 changes.

Manner 3:

The intent execution network element indicates the intent management network element that an executable command of the intent #1 changes, or execution of the intent #1 ends, or execution of the intent #1 is suspended.

The intent management network element determines, based on the indication of the intent execution network element, that the status of the intent #1 changes.

S207: The intent management network element sends second information to the intent translation network element, where the second information indicates that the statuses of the one or more of the N intents change. Correspondingly, the intent translation network element receives the second information.

It should be understood that the second information includes identification information of the one or more intents.

The following describes two cases in which the intent management network element sends the second information to the intent translation network element.

Case 1:

Corresponding to Case 1 in S205, because the intent management network element stores the first information, when the intent management network element determines that a status of an intent changes, the intent management network element further determines whether the intent is an intent included in the first information. When the intent is the intent included in the first information, the intent management network element sends the second information to the intent translation network element.

For example, when the intent management network element determines that the status of the intent #1 changes in S206, the intent management network element further determines that the intent #1 is the intent included in the first information. In this case, the intent management network element sends the second information to the intent translation network element. The second information includes an identifier of the intent #1.

It should be understood that the intent management network element may determine, based on the conflict type information, to send the second information to the intent translation network element.

Case 2:

Corresponding to Case 2 in S205, when the intent management network element determines that a status of an intent changes, the intent management network element queries a context of the intent. When the context of the intent includes the conflict type information and the identification information of the first information, the intent management network element sends the second information to the intent translation network element, where the second information includes identification information of the intent and the identification information of the first information.

For example, in S206, the intent management network element determines that the status of the intent #1 changes. The intent management network element queries a context of the intent #1, and obtains the identification information and the conflict type information of the first information from the context of the intent #1. The intent management network element determines, based on the conflict type information, to send the second information to the intent translation network element. The second information includes identification information of the intent #1 and the identification information of the first information. It should be understood that the intent management network element may also determine, based on the conflict type information, that the second information needs to be immediately sent to the intent translation network element after the status of the intent #1 changes.

S208: The intent translation network element updates the first information based on the second information.

Corresponding to Case 1 in S207, the second information does not include the identification information of the first information. In this case, the intent translation network element may query specific information to determine whether the information includes identifiers of one or more intents indicated by the second information. When the information includes the identifier of the one or more intents indicated by the second information, the information is updated.

For example, the intent translation network element stores the first information, the first information includes identifiers of the intent #1, the intent #2, and the intent #3, and the first information is an intent that conflicts with the intent #5. The intent translation network element further stores sixth information, the sixth information includes an identifier of the intent #4, and the sixth information is an intent that conflicts with the intent #6. The intent translation network element receives the second information, where the second information indicates that the status of the intent #1 changes, and the second information includes the identifier of the intent #1. In this case, the intent translation network element queries the first information and the sixth information, and updates the first information when determining that the first information includes the identifier of the intent #1 or does not update the sixth information when determining that the sixth information does not include the identifier of the intent #1.

Corresponding to Case 2 in S207, the second information includes the identification information of the first information. In this case, the intent translation network element may update the first information based on the identification information of the first information.

According to the solution of this application, the second information obtained by the intent translation network element may include the identification information of the first information, so that the intent translation network element learns that the first information needs to be updated, instead of updating other information, thereby improving efficiency of updating the first information by the intent translation network element based on the second information.

The following describes a manner in which the intent translation network element updates the first information based on the second information.

Manner 1:

The intent translation network element marks one or more intents in the first information based on the second information. In a possible implementation, a specific field may be added to the first information to mark one or more intents.

For example, the second information includes the identification information of the intent #1. The intent translation network element marks the intent #1 in the first information based on the identification information of the intent #1. When the first information includes the intent #1, the intent #2, and the intent #3, the updated first information is shown in Table 3.

TABLE 3

| | |
|---|---|
| Intent #1 | ○ |
| Intent #2 | |
| Intent #3 | |

Manner 2:

The intent translation network element deletes the identifiers of the one or more intents from the first information based on the second information.

For example, the second information includes the identification information of the intent #1. The intent translation network element deletes the identifier of the intent #1 from the first information based on the identification information of the intent #1. When the first information includes the intent #1, the intent #2, and the intent #3, the updated first information is shown in Table 4.

TABLE 4

| |
|---|
| Intent #2 |
| Intent #3 |

It should be understood that the process of S206 to S208 in this application may be performed for one or more times.

According to the solution of this application, the intent translation network element may determine, in a manner of updating the first information for one or more times, that the status of the at least one intent that conflicts with the first intent changes.

S209: After determining that the statuses of the N intents all change, the intent translation network element initiates a procedure of enabling the first intent.

The following describes a manner in which the intent translation network element determines that the statuses of the N intents all change.

Manner 1:

Corresponding to Manner 1 in S208, when the intent translation network element marks all the N intents in the first information based on at least one piece of second information, the intent translation network element determines that the statuses of the N intents all change.

Manner 2:

Corresponding to Manner 2 in S208, when the intent translation network element deletes the identifiers of the N intents from the first information based on the at least one piece of second information, the intent translation network element determines that the statuses of the N intents all change.

After determining that the statuses of the N intents all change, the intent translation network element may determine, based on the fourth information, that the first intent corresponds to the first information, and initiate the procedure of enabling the first intent.

Specifically, the intent translation network element may perform the syntax conflict detection on the first intent again.

According to the solution of this application, the intent translation network element determines, by generating the fourth information, that the first information is associated with the first intent. Therefore, after determining that the statuses of the N intents all change, the intent translation network element needs to initiate the procedure of enabling the first intent instead of initiating a procedure of enabling another intent.

According to the solution of this application, when the first intent is in a conflict state, the intent translation network element may initiate the procedure of enabling the first intent after determining that statuses of all intents that conflict with the first intent change. Compared with that an intent management network element periodically initiates the procedure of enabling the first intent, the solution in this application can be used to re-initiate, in a timely, accurate, and efficient manner, the procedure of enabling the first intent.

Figure 3:
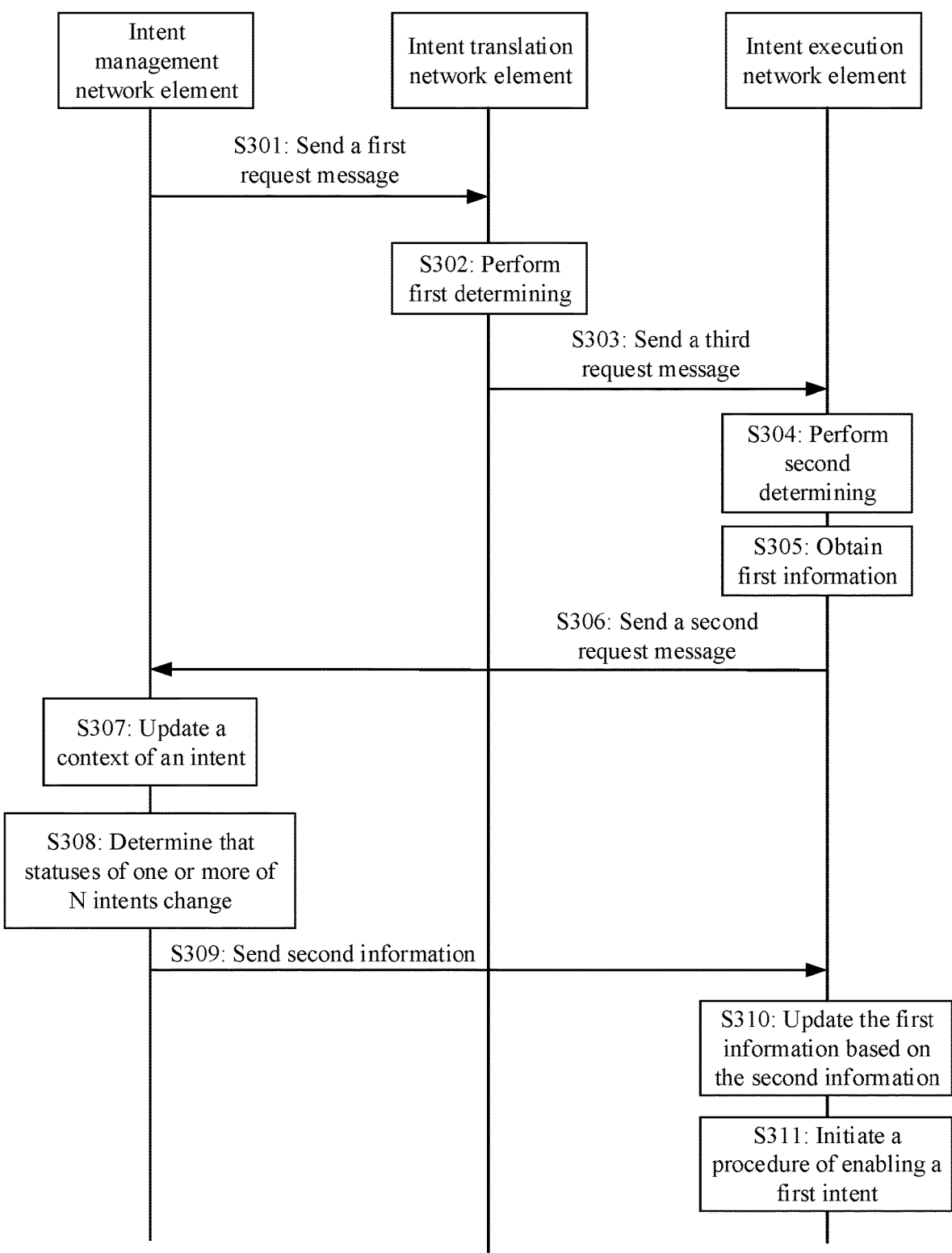
FIG. 3 is a schematic interaction diagram of another example of a method according to this application.

The following describes in detail the solutions provided in this application with reference to FIG. 3. It should be understood that the solution shown in FIG. 3 may be applicable to the system shown in FIG. 1. In this case, a first network element is an intent execution network element.

S301: An intent management network element sends a first request message to an intent translation network element. The first request message is used to request to implement a first intent. Correspondingly, the intent translation network element receives the first request message.

S302: The intent translation network element performs first determining, where the first determining determines whether a syntax conflict exists between the first intent and an intent that is running in a system.

When a result of the first determining is no, or the result of the first determining is yes, but the first intent is still implemented, the method further includes the following step:

S303: The intent translation network element sends a third request message to the intent execution network element, where the third request message is used to request to execute the first intent. Correspondingly, the intent execution network element receives the third request message.

S304: The intent execution network element performs second determining, where the second determining determines whether an operation conflict exists between the first intent and an intent that is running in the system.

When a result of the second determining is yes and the first intent is not implemented, the method further includes the following step:

S305: The intent execution network element locally obtains first information based on the result of the second determining, where the first information includes identifiers of N intents, and the N intents are all intents that conflict with the first intent. In addition, the intent execution network element generates and stores fourth information. The fourth information indicates that the first information corresponds to the first intent.

In a possible implementation, the intent execution network element may further generate identification information of the first information.

In a possible implementation, the intent execution network element may further locally obtain fifth information based on the result of the second determining. The fifth information includes an operation in which each of the N intents conflicts with the first intent.

S306: The intent execution network element sends a second request message to the intent management network element, where the second request message is used to request to update a context of the intent. Correspondingly, the intent management network element receives the second request message.

This process is similar to that of S204. That is, the intent execution network element completes an action of the intent translation network element in S204.

S307: The intent management network element updates the context of the intent based on the second request message.

This process is similar to that of S205. A difference lies in that the intent management network element may determine conflict type information based on a sender of the second request message. In this case, the intent management network element receives the second request message from the intent execution network element, and the intent management network element determines that the conflict type information indicates an operation conflict.

S308: The intent management network element determines that statuses of one or more of the N intents change.

This process is the same as S206. For details, refer to descriptions in S206.

S309: The intent management network element sends second information to the intent execution network element, where the second information indicates that the statuses of the one or more of the N intents change. Correspondingly, the intent execution network element receives the second information.

This process is similar to that of S207. A difference lies in that the intent management network element sends the second information to the intent translation network element in S207, and the intent management network element sends the second information to the intent execution network element in S309. For details, refer to descriptions in S207.

S310: The intent execution network element updates the first information based on the second information.

This process is similar to that of S208. That is, the intent execution network element completes an action of the intent translation network element in S208.

S311: After determining that statuses of the N intents all change, the intent execution network element initiates a procedure of enabling the first intent.

It should be understood that a manner in which the intent execution network element determines that the statuses of the N intents all change is similar to Manner 1 and Manner 2 in S209. That is, the intent execution network element completes actions of the intent translation network element in Manner 1 and Manner 2 in S209.

After determining that the statuses of the N intents all change, the intent execution network element may determine, based on the fourth information, that the first intent corresponds to the first information, and initiate the procedure of enabling the first intent.

Specifically, the intent execution network element may send third information to the intent translation network element. The third information indicates to perform syntax conflict detection on the first intent.

According to the solution of this application, when the first intent is in a conflict state, the intent execution network element may initiate the procedure of enabling the first intent after determining that statuses of all intents that conflict with the first intent change. Compared with that an intent management network element periodically initiates the procedure of enabling the first intent, the solution in this application can be used to re-initiate, in a timely, accurate, and efficient manner, the procedure of enabling the first intent.

Figure 4:
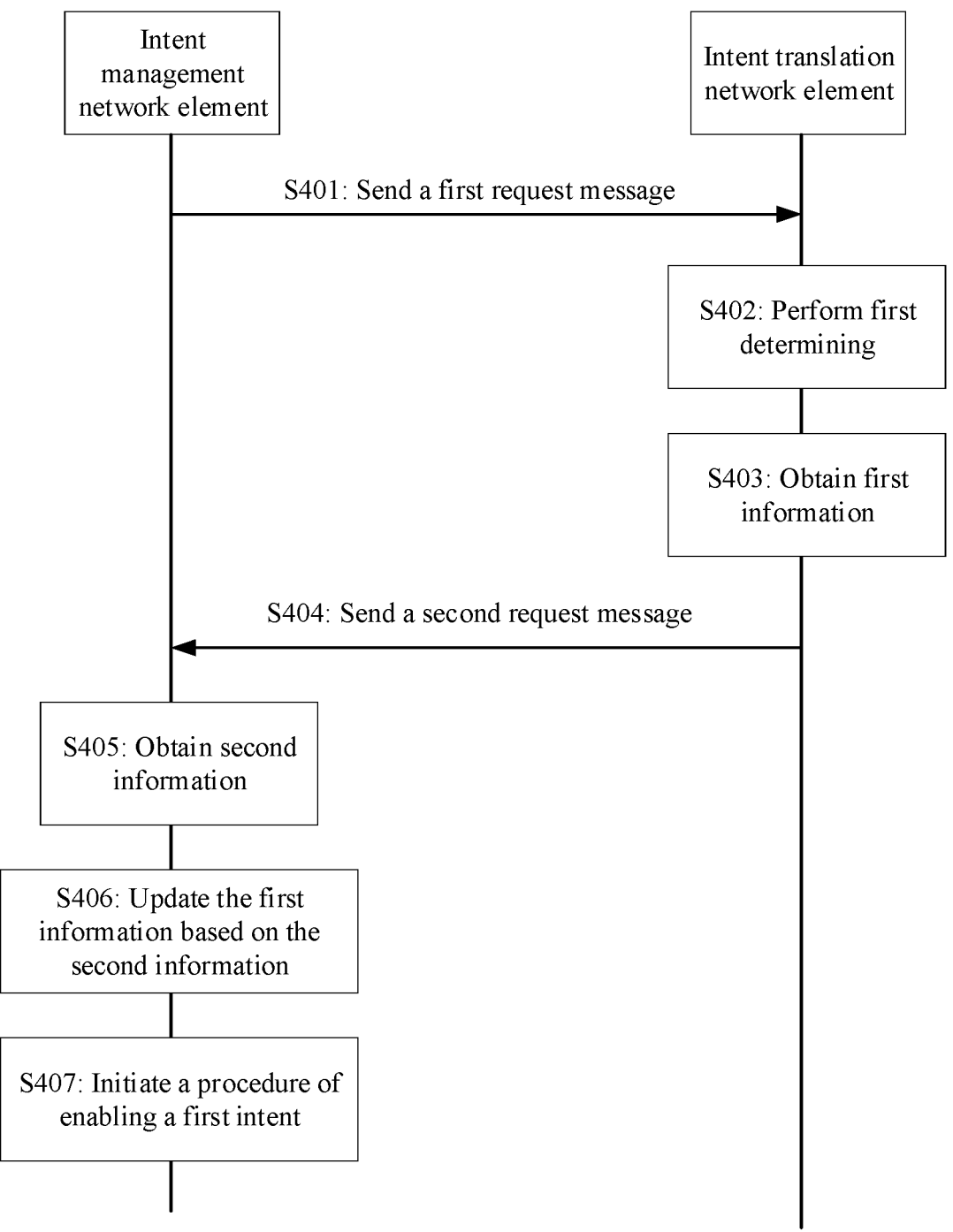
FIG. 4 is a schematic interaction diagram of another example of a method according to this application.

The following describes in detail the solutions provided in this application with reference to FIG. 4. It should be understood that the solution shown in FIG. 4 may be applicable to the system shown in FIG. 1. In this case, a first network element is an intent management network element, and a second network element is an intent translation network element.

S401: An intent management network element sends a first request message to an intent translation network element, where the first request message is used to request to implement a first intent. Correspondingly, the intent translation network element receives the first request message.

S402: The intent translation network element performs first determining, where the first determining determines whether a syntax conflict exists between the first intent and an intent that is running in a system.

When a result of the first determining is yes, and the first intent is not implemented, the method further includes the following step:

S403: The intent translation network element locally obtains first information based on the result of the first determining, where the first information includes identifiers of N intents, and the N intents are all intents that conflict with the first intent. In addition, the intent translation network element generates and stores fourth information. The fourth information indicates that the first information corresponds to the first intent.

This process is the same as S203. For details, refer to descriptions in S203.

S404: The intent translation network element sends a second request message to the intent management network element, where the second request message is used to request to update a context of the intent. Correspondingly, the intent management network element receives the second request message.

The second request message is used to indicate to set the first intent to a conflict state.

The second request message further includes the first information and the fourth information.

S405: The intent management network element obtains second information, where the second information indicates that statuses of one or more of the N intents change.

The following uses an example in which the first intent is an intent #5, the N intents include an intent #1, an intent #2, and an intent #3, and the intent management network element determines that a status of the intent #1 changes for description. That is, the N intents are all intents that conflict with the intent #5.

The following describes a manner in which the intent management network element determines that the status of the intent #1 changes.

Manner 1:

The intent management network element receives the second information from an intent consumption network element. The second information indicates any one of the following:

deleting the intent #1, setting the intent #1 to the conflict state, and modifying the intent #1.

Manner 2:

The intent management network element sends a third request message, where the third request message requests to implement an intent #6.

The intent translation network element performs syntax conflict detection and determines that a syntax conflict exists between the intent #1 and the intent #6. Alternatively, the intent execution network element performs operation conflict detection, and determines that an operation conflict exists between the intent #1 and the intent #6.

The intent translation network element or the intent execution network element sends the second information to the intent management network element. The second information indicates to set the intent #1 to the conflict state. It should be understood that when the intent #1 conflicts with the intent #6, the intent translation network element or the intent execution network element chooses to implement the intent #6. In a possible implementation, the intent translation network element or the intent execution network element may be selected based on a priority of the intent. For example, the priority of the intent #6 is higher than that of the intent #1.

Manner 3:

The intent execution network element sends the second information to the intent management network element. The second information indicates any one of the following:

changing an executable command of the intent #1, ending execution of the intent #1, and suspending execution of the intent #1.

S406: The intent management network element updates the first information based on the second information.

In a possible implementation, when the intent management network element determines that a status of an intent changes, the intent management network element may query whether the intent belongs to the N intents included in the first information, and when determining that the intent is the intent included in the first information, the intent management network element updates the first information.

It should be understood that a manner in which the intent management network element updates the first information based on the second information is similar to Manner 1 and Manner 2 in S208. That is, the intent management network element performs actions of the intent translation network element in Manner 1 and Manner 2 in S208.

S407: After determining that the statuses of the N intents all change, the intent management network element initiates a procedure of enabling the first intent.

It should be understood that a manner in which the intent management network element determines that the statuses of the N intents all change is similar to Manner 1 and Manner 2 in S209. That is, the intent management network element performs actions of the intent translation network element in Manner 1 and Manner 2 in S209.

After determining that the statuses of the N intents all change, the intent management network element may determine, based on the fourth information, that the first intent corresponds to the first information, and initiate the procedure of enabling the first intent.

Specifically, the intent management network element may send third information to the intent translation network element. The third information indicates to perform syntax conflict detection on the first intent.

According to the solution of this application, when the first intent is in the conflict state, the intent management network element may obtain the first information from the intent translation network element, and after determining that statuses of all intents that conflict with the first intent change, initiate the procedure of enabling the first intent. Compared with that an intent management network element periodically initiates the procedure of enabling the first intent, the solution in this application can be used to re-initiate, in a timely, accurate, and efficient manner, the procedure of enabling the first intent.

Figure 5:
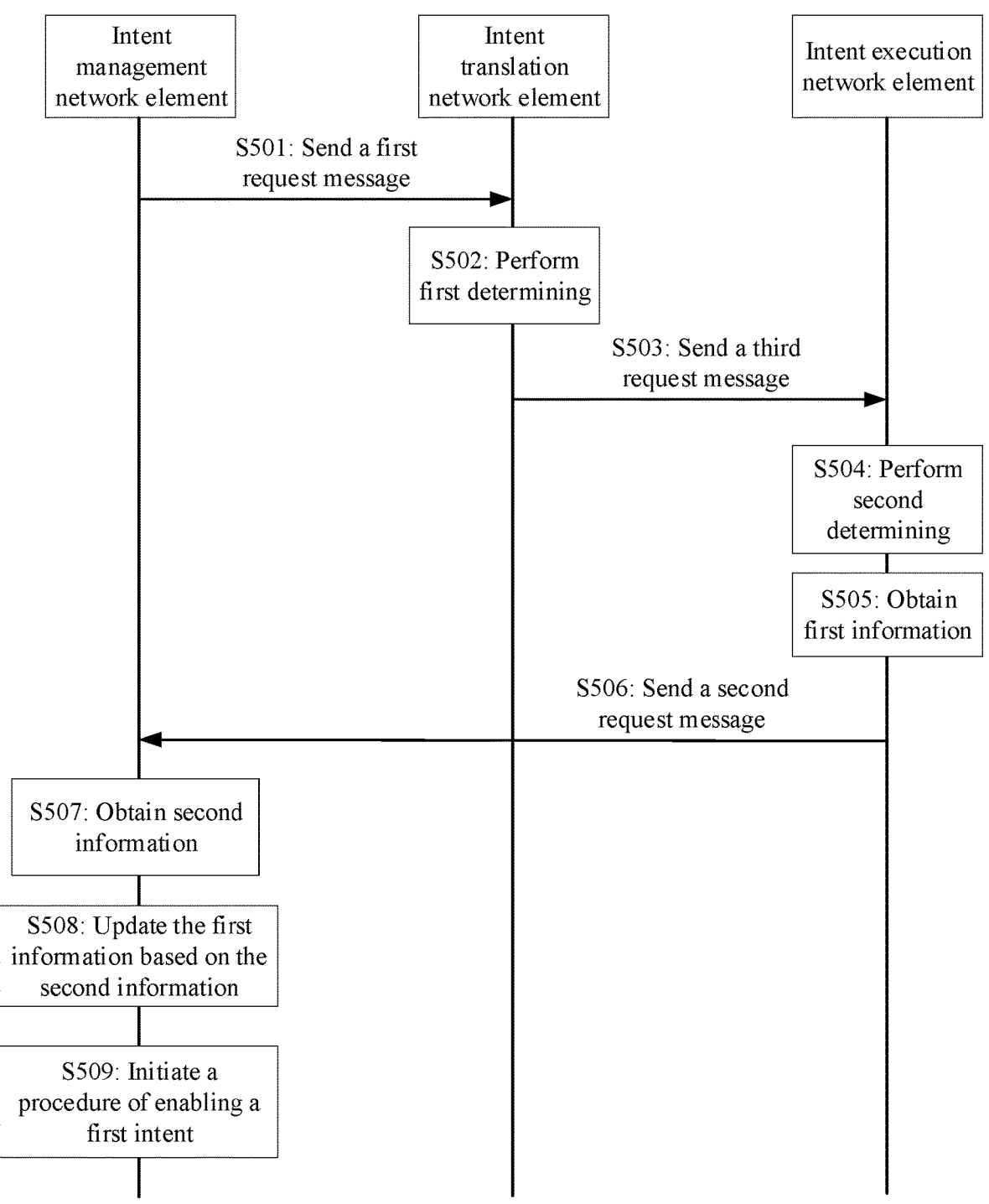
FIG. 5 is a schematic interaction diagram of another example of a method according to this application.

The following describes in detail the solutions provided in this application with reference to FIG. 5. It should be understood that the solution shown in FIG. 5 may be applicable to the system shown in FIG. 1. In this case, a first network element is an intent management network element, and a second network element is an intent execution network element.

S501: An intent management network element sends a first request message to an intent translation network element, where the first request message is used to request to implement a first intent. Correspondingly, the intent translation network element receives the first request message.

S502: The intent translation network element performs first determining, where the first determining determines whether a syntax conflict exists between the first intent and an intent that is running in a system.

When a result of the first determining is no, or the result of the first determining is yes, but the first intent is still implemented, the method further includes the following step:

S503: The intent translation network element sends a third request message to the intent execution network element, where the third request message is used to request to execute the first intent. Correspondingly, the intent execution network element receives the third request message.

S504: The intent execution network element performs second determining, where the second determining determines whether an operation conflict exists between the first intent and an intent that is running in the system.

When a result of the second determining is yes and the first intent is not implemented, the method further includes the following step:

S505: The intent execution network element locally obtains first information based on the result of the second determining, where the first information includes identification information of N intents, and the N intents are all intents that conflict with the first intent. In addition, the intent execution network element generates and stores fourth information. The fourth information indicates that the first information corresponds to the first intent.

In a possible implementation, the intent execution network element may further locally obtain fifth information based on the result of the second determining. The fifth information includes an operation in which each of the N intents conflicts with the first intent.

S506: The intent execution network element sends a second request message to the intent management network element, where the second request message is used to request to update a context of the intent. Correspondingly, the intent management network element receives the second request message.

The second request message is used to indicate to set the first intent to a conflict state.

The second request message further includes the first information and the fourth information.

S507: The intent management network element obtains second information, where the second information indicates that statuses of one or more of the N intents change.

This process is the same as S405. For details, refer to descriptions in S405.

S508: The intent management network element updates the first information based on the second information.

This process is the same as S406. For details, refer to descriptions in S406.

S509: After determining that the statuses of the N intents all change, the intent management network element initiates a procedure of enabling the first intent.

This process is the same as S407. For details, refer to descriptions in S407.

According to the solution of this application, when the first intent is in the conflict state, the intent management network element may obtain the first information from the intent execution network element, and after determining that statuses of all intents that conflict with the first intent change, initiate the procedure of enabling the first intent. Compared with that an intent management network element periodically initiates the procedure of enabling the first intent, the solution in this application can be used to re-initiate, in a timely, accurate, and efficient manner, the procedure of enabling the first intent.

Figure 6:
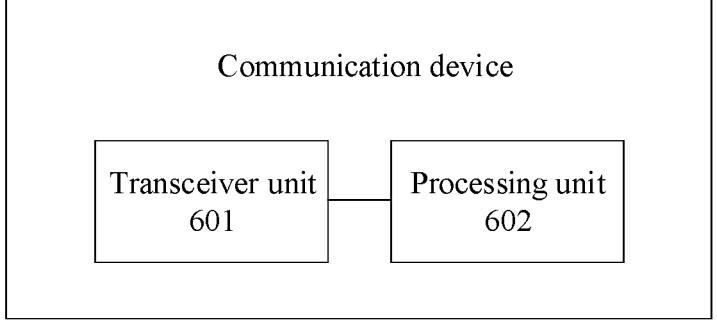
FIG. 6 is a schematic block diagram of a communication device according to this application.

According to the foregoing method, FIG. 6 shows a communication device according to an embodiment of this application. The communication device includes a transceiver unit 601 and a processing unit 602. The transceiver unit 601 may be configured to implement receiving and sending functions in the method embodiments. Other functions in the method embodiments may be implemented by using the processing unit 602. The transceiver unit may be implemented by using an input interface and an output interface in a data processing chip. Sending and receiving in the method embodiments respectively correspond to output and input in the chip. The transceiver unit 601 may be further split into a receiving unit and a sending unit. The receiving unit may be configured to implement the receiving function in the method embodiments, and the sending unit may be configured to implement the sending function in the method embodiments. The receiving unit may be implemented by using the output interface in the data processing chip, and the sending unit may be implemented by using the input interface of the data processing chip. In addition, the transceiver unit and the processing unit may be implemented by using a same chip. This is not limited in this application. It should be understood that the transceiver unit 601 in this embodiment of this application may be further implemented by a transceiver (including a transmitter and a receiver) or a transceiver-related circuit component, and the processing unit 602 may be further implemented by a processor or a processor-related circuit component (or referred to as a processing circuit).

For example, when the communication device is the intent management network element, the transceiver unit 601 and the processing unit 602 may support actions completed by the intent management network element in the foregoing method example. For example, the transceiver unit 601 may complete sending the first request message in the foregoing method embodiments and another process in the technical solution described in this specification. The processing unit 602 may complete updating the first information based on the second information and another process in the technical solution described in this specification.

For example, when the communication device is the intent translation network element, the transceiver unit 601 and the processing unit 602 may support actions completed by the intent translation network element in the foregoing method example. For example, the transceiver unit 601 may complete receiving the first request message in the foregoing method embodiments and another process in the technical solution described in this specification. The processing unit 602 may complete performing first determining, updating the first information based on the second information, and another process in the technical solution described in this specification.

For example, when the communication device is the intent execution network element, the transceiver unit 601 and the processing unit 602 may support actions completed by the intent execution network element in the foregoing method example. For example, the transceiver unit 601 may complete receiving the third request message in the foregoing method embodiments and another process in the technical solution described in this specification. The processing unit 602 may complete performing second determining, updating the first information based on the second information, and another process in the technical solution described in this specification.

Figure 7:
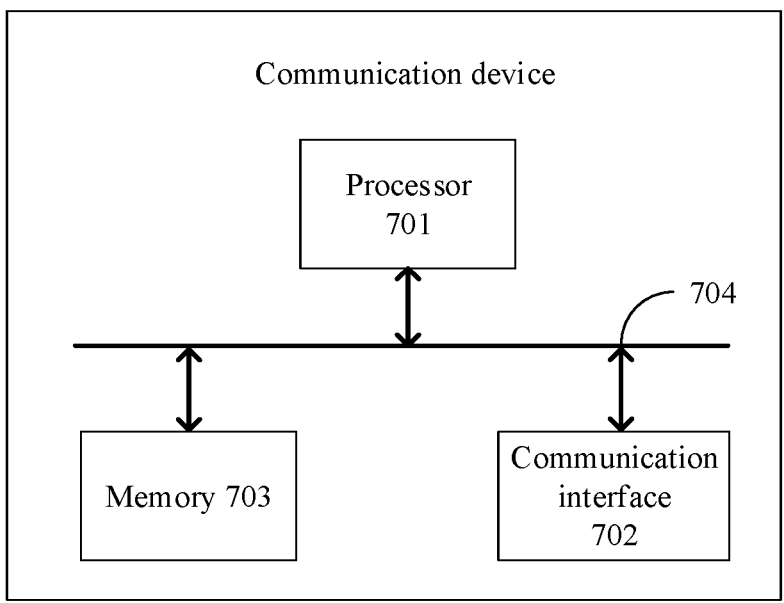
FIG. 7 is another schematic block diagram of a communication device according to this application.

An embodiment of this application further provides a communication apparatus. As shown in FIG. 7, the communication apparatus includes a processor 701, a communication interface 702, and a memory 703. The processor 701, the communication interface 702, and the memory 703 may be connected to each other by using a bus 707. The bus 707 may be a peripheral component interconnect (peripheral component interconnect, PCI) bus, an extended industry standard architecture (extended industry standard architecture, EISA) bus, or the like. The bus 707 may be categorized as an address bus, a data bus, a control bus, or the like. For ease of representation, only one bold line is used to represent the bus in FIG. 7, but this does not mean that there is only one bus or only one type of bus. The processor 701 may be a central processing unit (central processing unit, CPU), a network processor (network processor, NP), or a combination of the CPU and the NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof. The memory 703 may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache.

The processor 701 is configured to implement a data processing operation of the communication apparatus. The communication interface 702 is configured to implement a receiving and sending operation of the communication apparatus.

For example, when the communication apparatus is the intent management network element, the processor 701, the communication interface 702, and the memory 703 may support actions completed by the intent management network element in the foregoing method example. For example, the communication interface 702 may complete sending the first request message in the foregoing method embodiments and another process in the technical solution described in this specification. The processor 701 may complete updating the first information based on the second information and another process in the technical solution described in this specification.

For example, when the communication apparatus is the intent translation network element, the processor 701, the communication interface 702, and the memory 703 may support actions completed by the intent translation network element in the foregoing method example. For example, the communication interface 702 may complete receiving the first request message in the foregoing method embodiments and another process in the technical solution described in this specification. The processor 701 may complete performing first determining, updating the first information based on the second information, and another process in the technical solution described in this specification.

For example, when the communication apparatus is the intent execution network element, the processor 701, the communication interface 702, and the memory 703 may support actions completed by the intent execution network element in the foregoing method example. For example, the communication interface 702 may complete receiving the third request message in the foregoing method embodiments and another process in the technical solution described in this specification. The processor 701 may complete performing second determining, updating the first information based on the second information, and another process in the technical solution described in this specification.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A skilled person may use different methods for particular applications to implement the described functions, but this implementation should not be considered as beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus and method may be implemented in other manners. For example, the described apparatus embodiments are merely examples. For example, the division of units is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the function is implemented in a form of a software functional unit and sold or used as an independent product, the function may be stored in a computer-readable storage medium. Based on such an understanding, the technical solutions in this application essentially, or the part contributing to the conventional technology, or some of the technical solutions may be implemented in a form of a software product. A computer software product is stored in a storage medium, and includes several instructions for enabling a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to an intent provision network element of a network function virtualization (NFV) system, wherein the intent provision network element comprises an intent translation network element, an intent management network element and an intent execution network element, and the method comprises:

obtaining, by a first network element that is one of the intent translation network element, the intent management network element or the intent execution network element, first information indicating a plurality of intent instances that conflict with a first intent instance, wherein the plurality of intent instances are running in a system and are different from the first intent instance;

determining, by the first network element, that a status of at least one intent instance of the plurality of intent instances changes;

updating, by the first network element, the first information by updating information corresponding to the at least one intent instance;

determining, by the first network element, that statuses of all of the plurality of intent instances change; and initiating, by the first network element in response to the determination that the statuses of all of the plurality of intent instances change, a procedure of enabling the first intent instance.

2. The method of claim 1, wherein the first network element is the intent management network element, wherein the obtaining, by the first network element, the first information comprises:

receiving, by the intent management network element from a second network element that is the intent translation network element or the intent execution network element, a first request message that comprises the first information and indicates to set the first intent instance to a conflict state.

3. The method of claim 2, wherein the first request message comprises identification information of the first information and the first information includes identification information of the plurality of intent instances, and the method further comprises:

recording, by the intent management network element after receiving the first request message, the first information and the identification information of the first information; and sending, by the intent management network element when determining that the status of the least one intent instance changes, second information to the second network element, wherein the second information includes identification information of the at least one intent instance and the identification information of the first information and that indicates a change of the status of the least one intent instance.

4. The method of claim 3, wherein the determining that the status of at least one intent instance in the plurality of intent instances changes comprises:

sending, by the intent management network element to the intent translation network element or the intent execution network element, a second request message for requesting to implement a second intent instance that is different from the first intent instance and the plurality of intent instances;

receiving, by the intent management network element, an indication that includes the identification information of the at least one intent instance and indicates the second intent instance conflict with the at least one intent instance; and determining, by the intent management network element based on the identification information of the at least one intent instance and the stored first information, that the status of the at least one intent instance in the plurality of intent instances changes.

5. The method of claim 2, wherein the determining that the status of the at least one intent instance of the plurality of intent instances changes is based on at least one of the following:

a first indication received from a consumption network element, wherein the first indication indicates to delete the at least one intent instance, to set the at least one intent instance to a conflict state, or to modify the at least one intent instance;

a second indication received from the intent translation network element or the intent execution network element, wherein the second indication indicates to set the at least one intent instance to a conflict state; or a third indication received from the intent execution network element, wherein the third indication indicates that an executable command of the at least one intent instance changes, or execution of the at least one intent instance ends, or execution of the at least one intent instance is suspended.

6. The method of claim 1, wherein the first network element is the intent translation network element or the intent execution network element, and the method further comprises:

performing a conflict detection on the first intent instance; and sending, by the first network element when detecting a conflict of the first intent instance with the plurality of intent instances, a first request message to the intent management network element, wherein the first request message comprises the first information and indicates to set the first intent instance to a conflict state.

7. The method of claim 6, wherein the first request message comprises identification information of the first information and the first information includes identification information of the plurality of intent instances; and wherein the determining, by the first network element, that the status of at least one intent instance of the plurality of intent instances changes comprise:

receiving, by the first network element from the intent management network element, second information that includes identification information of the at least one intent instance and the identification information of the first information and that indicates a change of the status of the least one intent instance.

8. A method applied to an intent provision network element of a network function virtualization (NFV) system, wherein the intent provision network element comprises an intent translation network element, an intent management network element and an intent execution network element, and the method comprises:

obtaining, by the intent management network element from a second network element that is the intent translation network element or the intent execution network element, first information indicating a plurality of intent instances that conflict with a first intent instance, wherein the plurality of intent instances are running in a system and are different from the first intent instance;

determining, by the intent management network element, that a status of at least one intent instance in the plurality of intent instances changes;

updating, by the intent management network element, the first information by updating information corresponding to the at least one intent instance; and sending, by the intent management network element to the second network element, second information indicating that the status of the at least one intent instance changes such that the second network element updates the first information stored in the second network element, wherein the first intent instance is to be initiated when statuses of all of the plurality of intent instances change.

9. The method of claim 8, wherein the first information is carried in a first request message that comprises identification information of the first information as well as the first information, the first information includes identification information of the plurality of intent instances, wherein the second information includes identification information of the at least one intent instance and the identification information of the first information.

10. The method of claim 9, the method further comprising:

recording, by the intent management network element, the first information and the identification information of the first information;

wherein the determining that the status of at least one intent instance in the plurality of intent instances changes comprises:

sending, by the intent management network element to the intent translation network element or the intent execution network element, a second request message for requesting to implement a second intent instance that is different from the first intent instance and the plurality of intent instances;

receiving, by the intent management network element, an indication that includes the identification information of the at least one intent instance and indicates the second intent instance conflict with the at least one intent instance; and determining, by the intent management network element based on the identification information of the at least one intent instance and the stored first information, that the status of the at least one intent instance in the plurality of intent instances changes.

11. The method of claim 8, wherein the determining that the status of the at least one intent instance of the plurality of intent instances changes is based on at least one of the following:

a first indication received from a consumption network element, wherein the first indication indicates to delete the at least one intent instance, to set the at least one intent instance to a conflict state, or to modify the at least one intent instance;

a second indication received from the intent translation network element or the intent execution network element, wherein the second indication indicates to set the at least one intent instance to a conflict state; or a third indication received from the intent execution network element, wherein the third indication indicates that an executable command of the at least one intent instance changes, or execution of the at least one intent instance ends, or execution of the at least one intent instance is suspended.

12. An apparatus, wherein the apparatus is one of an intent translation network element, an intent management network element or an intent execution network element of an intent provision network element for a network function virtualization NFV) system, the apparatus comprises a processor and a memory, wherein the memory is configured to store a computer program comprising instructions that, when executed by the processor, cause the apparatus to perform:

obtaining first information indicating a plurality of intent instances that conflict with a first intent instance, wherein the plurality of intent instances are running in a system and are different from the first intent instance;

determining that a status of at least one intent instance of the plurality of intent instances changes;

updating the first information by updating information corresponding to the at least one intent instance;

determining that statuses of all of the plurality of intent instances change; and initiating, in response to the determination that the statuses of all of the plurality of intent instances change, a procedure of enabling the first intent instance.

13. The apparatus of claim 12, wherein the apparatus is the intent management network element; and wherein the obtaining the first information comprises:

receiving, from a second network element that is the intent translation network element or the intent execution network element, a first request message that comprises the first information and indicates to set the first intent instance to a conflict state.

14. The apparatus of claim 13, wherein the first request message comprises identification information of the first information and the first information includes identification information of the plurality of intent instances, and the apparatus is further caused to perform:

recording, after receiving the first request message, the first information and the identification information of the first information; and sending, when determining that the status of the least one intent instance changes, second information to the second network element, wherein the second information includes identification information of the at least one intent instance and the identification information of the first information and that indicates a change of the status of the least one intent instance.

15. The apparatus of claim 14, wherein the determining that the status of the at least one intent instance in the plurality of intent instances changes comprises:

sending, to the intent translation network element or the intent execution network element, a second request message for requesting to implement a second intent instance that is different from the first intent instance and the plurality of intent instances;

receiving an indication that includes the identification information of the at least one intent instance and indicates the second intent instance conflict with the at least one intent instance; and determining, based on the identification information of the at least one intent instance and the stored first information, that the status of the at least one intent instance in the plurality of intent instances changes.

16. The apparatus of claim 13, wherein the determining that the status of the at least one intent instance of the plurality of intent instances changes is based on at least one of the following:

a first indication received from a consumption network element, wherein the first indication indicates to delete the at least one intent instance, to set the at least one intent instance to a conflict state, or to modify the at least one intent instance;

a second indication received from the intent translation network element or the intent execution network element, wherein the second indication indicates to set the at least one intent instance to a conflict state; or a third indication received from the intent execution network element, wherein the third indication indicates that an executable command of the at least one intent instance changes, or execution of the at least one intent instance ends, or execution of the at least one intent instance is suspended.

17. The apparatus of claim 12, wherein the first network element is the intent translation network element or the intent execution network element, and the method further comprises:

performing a conflict detection on the first intent instance; and sending, by the first network element when detecting a conflict of the first intent instance with the plurality of intent instances, a first request message to the intent management network element, wherein the first request message comprises the first information and indicates to set the first intent instance to a conflict state.

18. The apparatus of claim 17, wherein the first request message comprises identification information of the first information and the first information includes identification information of the plurality of intent instances; and wherein the determining that the status of the at least one intent instance of the plurality of intent instances changes comprise:

receiving second information from the intent management network element, wherein the second information includes identification information of the at least one intent instance and the identification information of the first information and that indicates a change of the status of the least one intent instance.

\*   \*   \*   \*   \*